United States Patent [19]

Ueyama

[11] Patent Number: 4,757,223
[45] Date of Patent: Jul. 12, 1988

[54] LINEAR ACTUATOR

[75] Inventor: Tsutomu Ueyama, Yawata, Japan

[73] Assignee: Dainippon Screen Mfg. Co., Ltd., Kyoto, Japan

[21] Appl. No.: 4,587

[22] Filed: Jan. 20, 1987

[30] Foreign Application Priority Data

Jan. 21, 1986 [JP] Japan .................................. 61-011509

[51] Int. Cl.⁴ .............................................. H02K 7/06
[52] U.S. Cl. ......................................... 310/82; 310/80; 310/82; 310/328; 310/331
[58] Field of Search ..................... 310/80, 82, 328, 331

[56] References Cited

U.S. PATENT DOCUMENTS

| | | | |
|---|---|---|---|
| 2,439,499 | 4/1948 | Williams | 310/82 X |
| 3,894,255 | 7/1975 | Newton, Jr. | 310/80 |
| 3,902,085 | 8/1975 | Bizzigotti | 310/328 |
| 4,495,432 | 1/1985 | Katsuma | 310/328 |
| 4,557,153 | 12/1985 | Ulbing | 310/80 X |
| 4,607,166 | 8/1986 | Tamaki | 310/328 X |
| 4,622,483 | 11/1986 | Staufenberg, Jr. | 310/331 X |

*Primary Examiner*—Mark O. Budd
*Assistant Examiner*—Judson H. Jones
*Attorney, Agent, or Firm*—Lowe, Price, Le Blanc, Becker & Shur

[57] ABSTRACT

A linear actuator constructed so as to convert deformation movements of a plurality of electrostrictive elements to a reciprocating movement of an output shaft thereof. The linear actuator comprises a planetary driving unit adapted to be driven by a plurality of electrostrictive elements in a casing body thereof, a precessional driving unit adapted to be driven by a plurality of electrostrictive elements therein a contact ring connected interlockingly to both the planetary driving unit and the precessional driving unit therein and the output shaft engaged loosely to the interior surface of the contact ring and supported reciprocatively by the casing body. The voltages applied to the electrostrictive elements are controlled so as for the contact ring to be driven to perform a planetary movement with being pressed onto the output shaft and to be driven to perform a precessional movement by the precessional driving unit. The contact point between the contact ring and the output shaft results in being driven to perform a relative movement with describing a spiral path by those planetary and precessional movements.

8 Claims, 3 Drawing Sheets

LINEAR ACTUATOR

BACKGROUND OF THE INVENTION

1. Field of the Invention

The present invention relates to a linear actuator adapted to be used, for example for an accurate positioning, and particularly to a linear actuator wherein the deformations of a plurality of electrostrictive elements are output as a linear movement of an output shaft.

2. Prior Art

As an example of an above-mentioned linear actuator, an actuator is disclosed in Japanese Provisional patent publication No. 59 (1984)-99977, as depicted in FIG. 11 of the present application.

As shown in FIG. 11 the linear actuator comprises ring-shaped elements 42, 42 which are composed of two pieces of electrostrictive elements 41, 41 affixed together and fixedly provided at a desired interval within a casing body 43. A cylindrical clamp element 44 extends within the interior circumference of the respective ring-shaped element 42 and is composed of an electrostrictive element which is radially extensible and contractible. An output shaft 45 extends through the clamp elements 44 so as to be moved axially reciprocatively by controlling voltages applied to the ring-shaped elements 42 and the clamp elements 44.

This kind of linear actuator is simple in construction, can be small-sized and is able to attain an ultradecelerated driving force without any reduction gears. Further more, since it has not a magnetic coil such as a solenoid, it is useful as a linear actuator of an ultraaccurate positioning mechanism and the like which refuse to be affected by a magnetic field.

However, since the above-mentioned prior linear actuator is constructed so as to move the output shaft reciprocatively by repeating intermittent movements of the clamp elements 44 (on a microscopic scale thereof), a smooth output can be hardly attained thereby.

Accordingly, to attain a smooth output, multiple clamp elements must be disposed along the output shaft. This is disadvantageous from a manufacturing standpoint as the construction thereof is complicated and both the setup and the adjustment between the clamp elements and the output shaft are difficult.

OBJECTS AND SUMMARY OF THE INVENTION

The present invention is directed to solving the problems noted above, and has for its object to provide a linear actuator wherein its output shaft can be moved smoothly reciprocatively at an ultradecelerated speed without the repetition of intermittent movements as described in the above-mentioned prior art.

The means of the present invention for accomplishing the above purpose is a linear actuator constructed so as for the deformations of a plurality of electrostrictive elements to be output as an ultradecelerated smooth reciprocative movement of an output shaft thereof. The linear actuator comprises a planetary driving unit adapted to be driven by a plurality of electrostrictive elements within a casing body thereof, a precessional driving unit adapted to be driven by a plurality of electrostrictive elements, a contact ring connected interlockingly to both the planetary driving unit and the precessional driving unit and an output shaft engaged loosely to the interior surface of the contact ring and supported reciprocatively by the casing body.

The planetary driving gears includes a plurality of electrostrictive elements connected to the exterior periphery of the contact ring and drives the contact ring to perform a planetary movement around the output shaft by controlling the phase of the voltage applied to the respective electrostrictive element. That is, the contact ring is adapted to revolve around the output shaft with the interior surface thereof being kept pressed onto the output shaft and also with shifting the contact point therebetween.

On the other hand, the precessional driving unit includes a plurality of electrostrictive elements connected to the contact ring and drives the contact ring to perform the precessional movement at a precessional angle $\theta$ around the output shaft by controlling the phase of the respective electrostrictive element, for example so as to advance the phase by $\pi/2$ relative to that of the planetary driving unit. That is, the contact ring is adapted to roll over around the exterior surface of the output shaft with the contact point describing a spiral path at the precessional angle $\theta$ by means of the movement incorporated with the planetary movement and the precessional movement. Therefore, the linear actuator moves the output shaft thereof smoothly reciprocatively.

Consequently, according to the present invention a smooth output can be attained because the contact ring moves smoothly relatively with describing a spiral path around the output shaft. Moreover, since the contact ring and the output shaft are constructed so as to move relatively with keeping the rolling contact therebetween, the setup and the adjustment thereof can be made easily without any difficulties.

The foregoing and other objects and attendant advantages of the present invention will be readily appreciated as the same becomes better understood by reference to the following detailed description when considered by the accompaning drawings, wherein:

BRIEF DESCRIPTION AND THE DRAWINGS

FIGS. 1 through 9 shows the first embodiment of the present invention;

FIG. 1 is a longitudinal sectional side view of a linear actuator;

FIG. 2 is a fragmentary sectional view on line II—II in FIG. 1 showing the relations between an output shaft and a contact ring in the linear actuator;

FIG. 3 is a fragmentary sectional view on line III—III in FIG. 1 showing the relations between the output shaft and a cylindrical member;

FIGS. 4 and 5 are views showing waveforms of applied voltages respectively for a planetary driving unit and a precessional driving unit;

FIG. 6 is a perspective view showing the relations among an output shaft, a contact ring and a cylindrical member;

FIG. 8 is a sectional front view showing the planetary driving unit and the precessional driving unit on view in the direction of arrow lines II—II and III—III;

FIG. 9 is a schematic explanatory view of the linear actuator;

DESCRIPTION OF THE PREFERRED EMBODIMENTS

Now preferred embodiments of the present invention will be described with reference to the accompanying drawings hereinafter.

Figure 1:
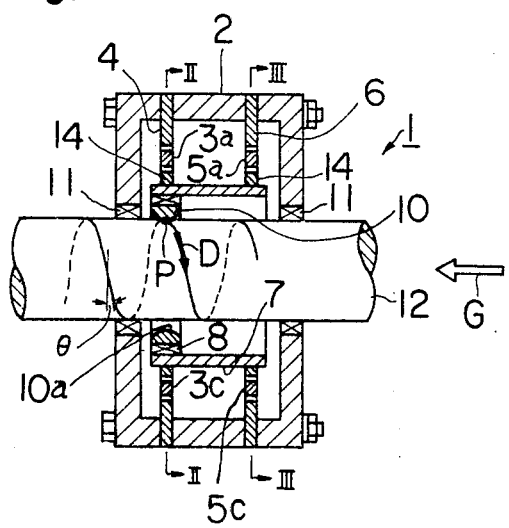

FIGS. 1 through 9 show the first embodiment of the present invention, and FIG. 1 is a longitudinal sectional side view of a linear actuator. As shown in FIG. 1, a linear actuator 1 comprises a planetary driving unit 4 adapted to be driven by a plurality of electrostrictive elements 3a-3d within a casing body 2 thereof, a precessional driving unit 6 adapted to be driven by a plurality of electrostrictive elements 5a-5d, a contact ring 10 supported rotationally through a bearing 8 within a cylindrical member 7 which is connected interlockingly to both the planetary driving unit 4 and the precessional driving unit 6 and an output shaft 12 fitted loosely into the contact ring with a small gap therebetween and supported reciprocatively through linear bearings 11, 11 by the casing body 2.

Figure 8:
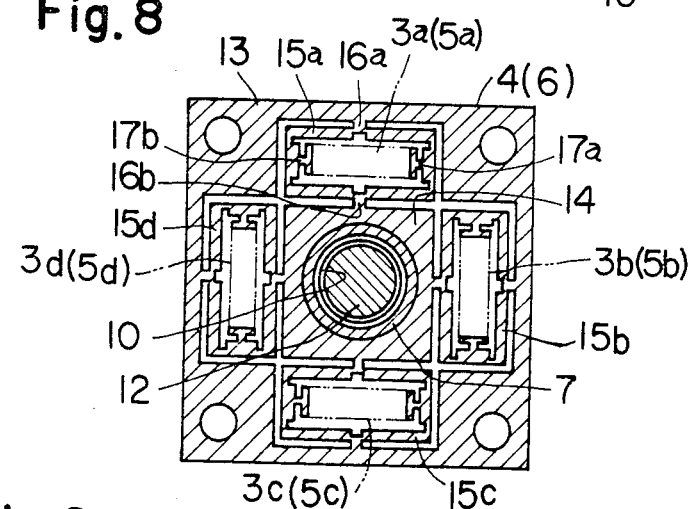

As shown in FIG. 8 the planetary driving unit 4 comprises a peripheral attaching portion 13 adapted to be fixed to the casing body 2, a central connecting portion 14 fixedly fitted around the cylindrical member 7 and four sets of strain variation magnifying portions 15(15a-15d) connected to both the peripheral attaching portion 13 and the central connecting portion 14 and composed of electrostrictive elements 3a-3d which are disposed oppositely at an equal interval around the output shaft 12, and is formed of an elastic metal plate integrally. The precessional driving unit 6 is also formed of an elastic metal plate in the same construction as shown in FIG. 8.

Figure 9:
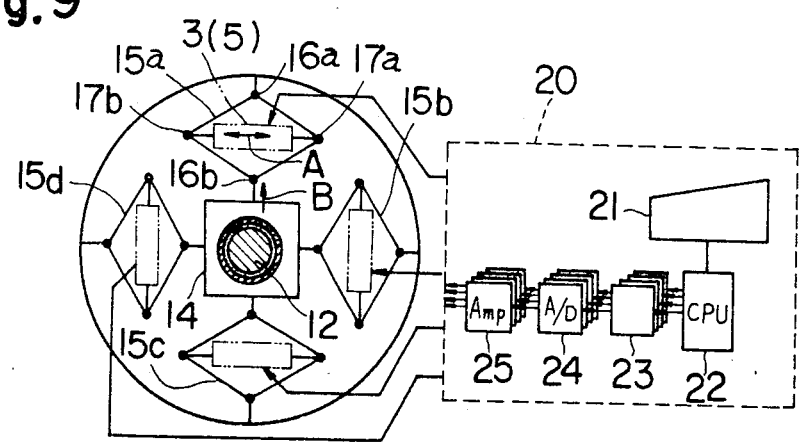

The strain variation magnifying portion 15 is constructed so as to form a four-directional magnification link mechanism as shown in FIG. 9. The opposite end portions 16a, 16b at the short axis side of the four-directional magnification link mechanism 15 are connected to the attaching portion 13 and to the connecting portion 14 respectively, and the opposite end portions 17a, 17b at the long axis side thereof are connected to the opposed ends of the electrostrictive elements 3a-3d or (5a-5d). Since the four-directional magnification link mechanism 15 is formed integrally of the elastic metal plate as abovedescribed, it is capable of deforming and restoring to the original state at its respective connecting portion 16a, 16b, 17a, 17b. Therefore, when the electrostrictive element 3 or 5 is controlled by a control circuit explained later and is extended in the direction of arrow A, the central connecting portion 14 connected thereto is pulled toward the direction of arrow B with its strain variation being magnified several times. Thereupon, since the displacement toward the direction of arrow B is inversely proportional to the lengths of the long axis and the short axis, the strain variation of the electrostrictive element 6 is magnified.

The electrostrictive element 3 or 5 (for example, "the stacked piezoelectric actuator element" made in Nippon Electricity Co., Ltd.) comprises a piezo-stack which is constructed by stacking and combining many piezoelectric members in the extensional direction thereof. For example, the element whose length being 9 mm is extended ab. 7.5 $\mu$ by the applied voltage of 150 V, thereby the driving force of ab. 20 KgW can be output.

Figure 4:
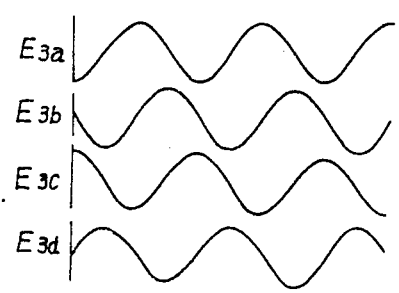
Figure 5:
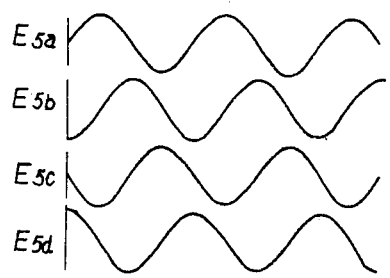

The control circuit 20 is used for controlling voltages E3a-E3d and E5a-E5d applied to the electrostrictive elements 3a-3d and 5a-5d as shown in FIG. 4 and FIG. 5 and comprises a voltage setting means 21, a computer 22, an operative waveform correction memory 23, an A-D converter circuit 24 and an amplifier circuit 25.

The operative waveform correction memory 23 is adapted to store the waveform correction data for correcting the applied voltages in order to correct a hysteresis of the electrostrictive elements 3 and 5 and an operative linearity attained by the strain variation magnifying portion 15.

Accordingly, the waveforms E3a-E3d, E5a-E5d of the voltages applied respectively to the electrostrictive elements 3a-3d, 5a-5d become the corrected sinusoidal waveform as shown in FIGS. 4 and 5, and the central connecting portion 14 driven through the strain variation magnifying portion 15 performs a smooth planetary movement.

As shown in FIG. 1, the cylindrical member 7 is fixedly supported at its opposite ends by the central connecting portions 14, 14 of the planetary driving unit 4 and the precessional driving unit 6, and the contact ring 10 is supported at the side of the planetary driving unit 4 by the bearing 8 held in the cylindrical member 7.

Figure 2:
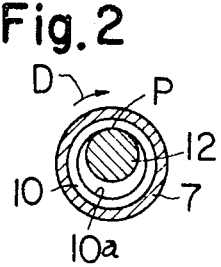
Figure 3:
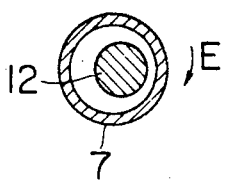

When the electrostrictive elements 3a-3d of the planetary driving unit 4 are controlled respectively by the applied voltages E3a-E3d as shown in FIG. 4 and the electrostrictive elements 5a-5d of the precessional driving unit 6 are also controlled respectively by the applied voltages E5a-E5d as shown in FIG. 5, the interior surface 10a of the contact ring 10 is pressed onto the output shaft 12 by the planetary operation of the planetary driving unit 4 so as for the contact point P therebetween to revolve in the clockwise direction (the direction of arrow D) as shown in FIG. 2 and for the end of the cylindrical member 7 at the side of the precessional driving unit 6 to perform the planetary movement in the clockwise direction (the direction of arrow E) by the planetary operation of the precessional driving unit 6. Thereupon, since the phase of the applied voltage for the precessional driving unit 6 (shown in FIG. 5) is advanced by $\pi/2$ relative to that of the applied voltage for the planetary driving unit 4 (shown in FIG. 4), the planetary operation of the precessional driving unit 6 drives the cylindrical member 7 to perform the precessional movement at a precessional angle $\theta$ and then to thrust the output shaft at the contact point P in the direction of arrow G.

Further the planetary movement and the precessional movement will be detailed hereinafter.

Figure 6:
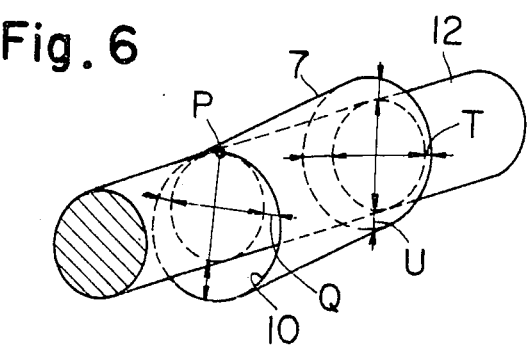
Figure 7A:
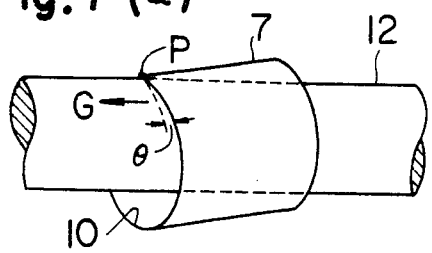
FIG. 7(a) is a side view in FIG. 6.
Figure 7B:
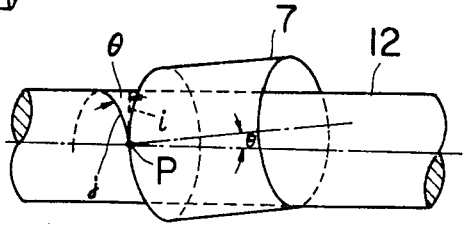
FIG. 7(b) is a plan view in FIG. 6.

FIG. 6 is an explanatory view of the operational principle of the present invention, FIG. 7(a) is a side view in FIG. 6 and FIG. 7(b) is a plan view in FIG. 6.

At one end of the cylindrical member 7 there is provided the contact ring 10, which is driven to perform the planetary movement by the planetary driving unit 4 and the contact point of which is moved to vary its position periodically relative to the output shaft. In FIGS. 6 and 7 the contact ring 10 is shown in a simplified form owing to the explanation. And at the other end of the cylindrical member 7 there is provided the precessional driving unit 6 as above-described. The other end thereof moves in the state of phase advanced by $\pi/2$ relative to the end at the side of the planetary driving unit 4 with varying its proximate point periodically without contacting to the output shaft 12.

Hence, the cylindrical member 7 results in performing the precessional movement relative to the output shaft 12. The cylindrical member 7 contacts the output shaft 12 at the point P through the contact ring 10, and the contact point P moves as time goes by, namely so as for the gap Q to change into the contact point C after the lapse of time corresponding to $\pi/2$.

On the other hand, the gap T shows the place where the cylindrical member 7 is closest to the output shaft 12, and moves as time goes by, namely so as for the gap U to change into the smallest gap after the lapse of time corresponding to $\pi/2$. Since the contact point P, the gap Q and the gaps T and U move as described above, the cylindrical member 7 operates to thrust the output shaft 12 in the direction of arrow G at the contact point P. Between the contact ring 10 and the output shaft 12 there is provided a non-skid means which prevents them from axially slipping.

As shown in FIG. 7, since one end of the cylindrical member 7 contacts to the output shaft 12 at the point P through the contact ring 10 and the precessional movement thereof is advanced always by $\pi/2$ relative to the other end thereof, the cylindrical member 7 always keeps the precessional angle $\theta$ at the contact point P of the contact ring 10 relative to the output shaft 12. And the contact point P describes a (FIG. 7b) as it revolves around the output shaft 12 always keeping the angle $\theta$. That is, the contact ring 10 provided in the interior of the cylindrical member 7 results in performing a spiral movement having the angle $\theta$ relative to the periphery i of the cross-section of the output shaft 12 at the contact point P.

Thereupon, the contact ring 10 and the output shaft 12 perform a relative revolution owing to the circumferential difference $2\pi(R-r)$ between the interior circumference $2\pi R$ of the interior of the contact ring 10 (provided that R is the radius of the interior circumferential circle) and the exterior circumference $2\pi r$ of the output shaft 12 (provided that r is the radius of the shaft). By means of the construction as above-described, the output of the actuator 1 is attained through the output shaft 12 supported reciprocatively.

The moving speed of the output shaft 12 is adjusted as occasion demands by changing the voltages E3a–E3d applied to the planetary driving unit 4 and the voltages E5a–E5d applied to the precessional driving unit 6 and by changing the phase difference between both the applied voltages so as to adjust the precessional angle $\theta$.

It is not always necessary to form the strain variation magnifying means 15 integrally. It can be also constructed by connecting a casing body 2 to a central connecting portion 14 through a strain variation magnifying portion 15.

Figure 10:
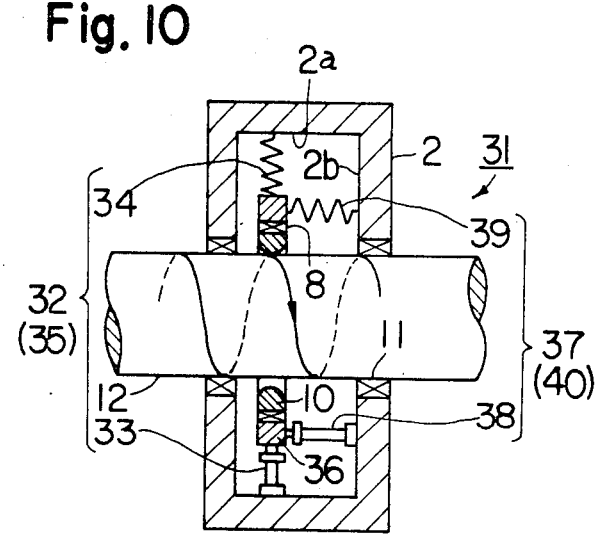
FIG. 10 is a longitudinal sectional side view showing another embodiment of the present invention.
Figure 11:
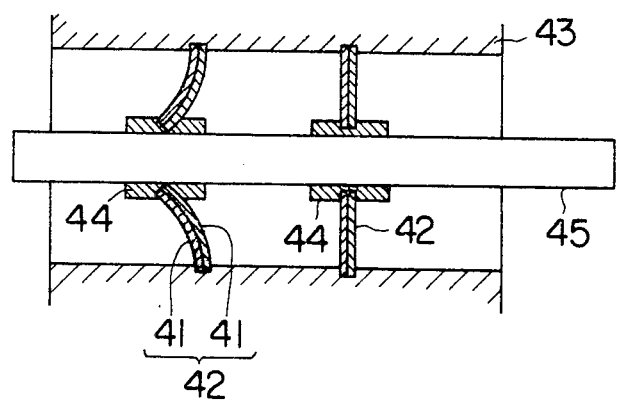
FIG. 11 is a longitudinal sectional side view showing a linear actuator in a prior art.

FIG. 10 is a longitudinal sectional side view showing another embodiment of the linear actuator according to the present invention. In FIG. 10 the parts common to those of the first embodiment are indicated by the same symbols as in FIG. 1.

In FIG. 10 the symbol 31 is a linear actuator according to another embodiment. In the linear actuator 31, a planetary driving unit 32 includes two sets of force back means 35 comprising a pair of electrostrictive elements 33 disposed oppositely in the state of being directed toward the output shaft 12 and a return spring 34. These force back means are fixed respectively to the interior surface 2a of the casing body 2 and are adapted to support an outer ring 36 transversely by the outer periphery thereof. Within the outer ring 36 the contact ring 10 is fitted through the bearing 8.

And a precessional driving unit 37 includes two sets of precessional means 40 comprising a pair of electrostrictive elements 38 disposed symmetrically relative to the output shaft 12 and a support spring 39. These precessional means 40 are fixed between the interior of one side wall 2b of the casing body 2 and the side surface of the outer ring 36 in the relations corresponding to the force back means 35 of the precessional driving unit 32.

That is, in the present embodiment the electrostrictive elements 3a, 3b and 5a, 5b in the first embodiment are replaced respectively by the return spring 34, 34 and the support spring 39, 39 so as to function the same as the first embodiment. That is, the contact ring 10 rolls over around the periphery of the output shaft 12 with being pressed onto the shaft 12 by the planetary driving unit 32 as well as performs the precessional movement at a predetermined precessional angle $\theta$ with being driven by the precessional driving unit 37.

By means of both movements, the contact ring 10 performs a relative movement while describing a spiral path around the periphery of the output shaft 12.

While the preferred embodiments of the present invention have been described above, it should be understood that various modifications may be made therein without departing from the spirit of the invention and the scope of the appended claims.

I claim:

1. A linear actuator comprising a casing body; a plurality of first electrostrictive elements in the casing body; a planetary driving unit adapted to be driven by said first element; a plurality of second electrostrictive elements in the casing body; a precessional driving united adapted to be driven by said second element; a contact ring means interlockingly connected to both the planetary driving unit and the precessional driving unit; a shaft loosely engaging an interior surface of the contact ring means and supported for reciprocative movement by the casing body; said contact ring means having a contact point with said shaft; and means for controlling voltages applied to said first and second electrostrictive elements so as to enable said contact ring means to be driven to perform a planetary movement by said planetary driving unit while also being driven by said precessional driving unit to perform a precessional movement so that the contact point between the interior surface of said contact ring means and said shaft performs a relative movement to describe a spiral path along the shaft as a result of the planetary movement and the precessional movement of the contact ring means to thereby linearly move the shaft along its axis.

2. A linear actuator as claimed in claim 1, further including a cylindrical member and said contact ring means having a contact ring fitted in the cylindrical member; and wherein the planetary driving unit and the precessional driving unit each comprise central connecting portions fixedly fitted around said cylindrical member, peripheral attaching portions fixed to the casing body and plural pairs of strain variation magnifying means connected to both the central connecting portions and the peripheral attaching portions and arranged in the direction toward the shaft to magnify the strain variations of the electrostrictive elements and thereby drive the contact ring to perform a planetary movement.

3. A linear actuator as claimed in claim 2, wherein the contact ring is supported within one end of the cylindrical member, said one end thereof being supported by the planetary driving unit and the other end thereof being supported by the precessional driving unit.

4. A linear actuator as claimed in claim 2, wherein the planetary driving unit and the precessional driving unit are respectively formed of elastic plates.

5. A linear actuator as claimed in claim 1, further including a voltage applying means for applying an operative waveform correcting voltage to the electrostrictive elements to drive the contact ring at a substantially uniform speed.

6. A linear actuator according to claim 3, wherein the phase of the applied voltage for the precessional driving unit is advanced by a predetermined amount relative to that of the applied voltage for the planetary driving unit to drive said cylindrical member under the precessional movement at a precessional angle $\theta$.

7. The linear actuator of claim 6, wherein said other end of the cylindrical member forms a gap encircling said output shaft, said gap changing at any circumferential position on the output shaft as a function of time due to the precessional movement of the cylindrical member.

8. The linear actuator of claim 1, wherein said contact point is the sole point of contact between said contact ring means and output shaft.

* * * * *